United States Patent [19]

Hirose et al.

[11] Patent Number: 5,034,502
[45] Date of Patent: Jul. 23, 1991

[54] PROCESS FOR PRODUCING A POLYARYLATE

[75] Inventors: Isamu Hirose; Eiichi Itoi; Tadashi Ishida, all of Kyoto, Japan

[73] Assignee: Unitika Ltd., Hyogo, Japan

[21] Appl. No.: 549,832

[22] Filed: Jul. 9, 1990

[30] Foreign Application Priority Data

Jul. 22, 1987 [JP] Japan .............................. 62-182895

[51] Int. Cl.[5] .................... C08G 63/00; C08G 67/00; C08G 69/00
[52] U.S. Cl. .................................... 528/271; 528/176
[58] Field of Search ............................ 528/176, 271

[56] References Cited

U.S. PATENT DOCUMENTS

| 4,374,239 | 2/1983 | Berger et al. | 528/176 |
| 4,485,230 | 11/1984 | Yu | 528/125 |
| 4,612,360 | 9/1986 | Ort | 528/182 |

*Primary Examiner*—John Kight, III
*Assistant Examiner*—T. Mosley
*Attorney, Agent, or Firm*—Sughrue, Mion, Zinn Macpeak & Seas

[57] ABSTRACT

A process for producing a polyarylate comprising the step of reacting (a) an aromatic dicarboxylic acid, (b) a bisphenol diacetate and (c) an aliphatic carboxylic acid anhydride of an aromatic dicarboxylic acid, to produce a polyarylate containing acid anhydride bonds. The polyarylate exhibits a high impact strength as well as a high weld strength, when formulated in a resin composition together with a polyamide.

16 Claims, No Drawings

PROCESS FOR PRODUCING A POLYARYLATE

This is a continuation of application Ser. No. 07/402,981, filed Sept. 5, 1989, which is a continuation of application Ser. No. 07/222,973, filed July 22, 1988, now abandoned.

FIELD OF THE INVENTION

This invention relates to a process for the production of a polyarylate More particularly, it relates to a process for the production of a polyarylate having acid anhydride bonds.

BACKGROUND OF THE INVENTION

It has been well known that a polyarylates composed of an aromatic dicarboxylic acid and a bisphenol are thermoplastic plastics having excellent mechanical, electrical and chemical properties, such as a high heat resistance Known processes for the production of a polyarylate include, for example, interfacial polymerization by mixing a solution of an aromatic dicarboxylic acid dihalide in an organic solvent with an alkaline aqueous solution of a bisphenol under stirring to react these materials (cf. EAREKSON J.P.S. 40 399 (1959)); solution polymerization by reacting an aromatic dicarboxylic acid dihalide with a bisphenol in the presence of a deacidifying agent such as pyridine in an organic solvent (cf. A. CONIX I.E.C. 51 147 (1959)); molten polymerization by reacting an aromatic dicarboxylic acid diphenyl ester with a bisphenol (cf. British Patent 924,607); molten polymerization by reacting an aromatic dicarboxylic acid, diphenyl carbonate and a bisphenol (cf. British Patent 1,067,314); molten polymerization by reacting an aromatic dicarboxylic acid with a bisphenol diacetate (cf. A. CONIX I.E.C. 51 147 (1959)); polymerization by reacting an aromatic dicarboxylic acid with a bisphenol diacetate in a solvent (cf. U.S. Pat. No. 4,294,956); and molten polymerization by directly reacting an aromatic dicarboxylic acid with a bisphenol (cf. JP-A-53-64298) (the term "JP-A" as used herein means an "unexamined published Japanese patent application").

The polyarylates thus obtained have been widely employed either alone or in the form of a composition together with other resin(s) in the fields of, for example, electricity, electronics, automobiles and machinery.

However, it is frequently observed that a resin composition containing a polyarylate together with other resin(s) fails to fully exhibit the expected properties of the constituents. For example, since a composition containing a polyarylate and a polyamide excels in a chemical resistance, molding characteristics and a heat resistance, the widely use thereof in the various fields is expected, but it is disadvantageous in its low impact strength and low weld strength. That is, a composition containing a polyarylate, which may be economically produced through the above-mentioned molten polymerization (wherein an aromatic dicarboxylic acid is reacted with a bisphenol diacetate), together with a polyamide has a low impact strength and a low weld strength, similar to those obtained by other methods.

It has been proposed to solve the above problem by introducing a functional group such as an acid anhydride bond to the polyarylate. For example, U.S. Pat. No. 4,258,154 proposes a composition containing a polyarylate having an acid anhydride bond and a polyamide, to improve an impact strength and a weld strength. Further, JP-A-56-88424 discloses a process for the production of a polyarylate having acid anhydride bonds through interfacial polymerization which comprises mixing an alkaline aqueous solution of an aromatic dicarboxylic acid and a bisphenol with a solution of an aromatic dicarboxylic acid dihalide in an organic solvent under stirring. However, this process is disadvantageous since the use of the expensive aromatic dicarboxylic acid dihalide elevates the production cost. Therefore, a process is urgently required for economically producing a polyarylate capable of imparting a high impact strength as well as a high weld strength to the reaction composition produced together with a polyamide.

SUMMARY OF THE INVENTION

Accordingly, an object of the present invention is to provide an advantageous process for the production of a polyarylate having acid anhydride bonds to solve the above problems.

It has now been found that this and other objects of the present invention can be attained by a process for producing a polyarylate having acid anhydride bonds which comprises reacting (a) an aromatic dicarboxylic acid, (b) a bisphenol diacetate and (c) an acid anhydride obtained from an aromatic dicarboxylic acid and an acid anhydride of an aliphatic carboxylic acid.

DETAILED DESCRIPTION OF THE INVENTION

According to the present invention, a polyarylate capable of exhibiting a high impact strength as well as a high weld strength when formulated into a composition together with, for example, a polyamide, can be economically produced.

Examples of the aromatic dicarboxylic acid (a) used in the present invention (hereinafter, referred to as "component (a)") include terephthalic acid, isophthalic acid and naphthalenedicarboxylic acid. Any one of these aromatic dicarboxylic acids or a mixture thereof may be employed.

The bisphenol diacetate (b) used in the present invention (hereinafter, referred to as "component (b)") are those obtained from a bisphenol of the general formula (I) and acetic anhydride or ketene:

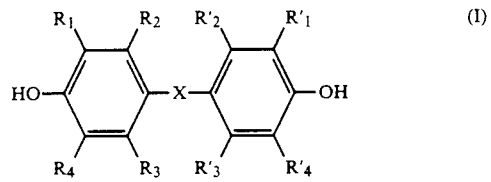

wherein X represents oxygen, sulfur, —SO—, —SO$_2$—, CO—, an alkylene group having 1 to 4 carbons, or an alkylidene group having 2 to 4 carbons; and R$_1$, R$_2$, R$_3$, R$_4$, R'$_1$, R'$_2$, R'$_3$ and R'$_4$, which may be the same or different, each represents hydrogen, a halogen or an alkyl group having 1 to 4 carbons.

The most preferred bisphenol diacetate is 2,2-bis-(4'-hydroxyphenyl)propane diacetate, i.e., bisphenol A diacetate.

In the preparation of the component (b) obtained from a bisphenol of the general formula (I) and acetic anhydride or ketene, it is preferred that the molar ratio of the bisphenol and the acetic anhydride or ketene is 1:2 or more.

For example, the preparation of bisphenol A diacetate obtained from bisphenol A and acetic anhydride is now illustrated by the following reference example:

22.8 g of bisphenol A and 25.5 g of acetic anhydride were introduced into a 150 ml three-necked flask provided with a reflux condenser and a stirrer, and stirred under heating at 140° C. for 7 hours. Then, the obtained reaction product was transferred to a 150 ml flask, and the acetic acid and acetic anhydride therein were removed by heating the mixture to 100° C. under reduced pressure of 10 Torr to obtain 31.1 g of bisphenol A diacetate.

The acid anhydride of an aromatic dicarboxylic acid and acid anhydride of an aliphatic carboxylic acid (c) (hereinafter, referred to as "component (c)") are those obtained from the aromatic dicarboxylic acids cited above and an acid anhydride of an aliphatic carboxylic acid having two to four carbon atoms ("acid anhydride of an aliphatic carboxylic acid" is hereinafter referred to as "acid anhydride α"). Examples of such component (c) include diacetic anhydride obtained from terephthalic acid and acetic anhydride, diacetic anhydride obtained from isophthalic acid and acetic anhydride and diacetic anhydride obtained from naphthalenedicarboxylic acid and acetic anhydride.

As the component (c), a di-acid anhydride obtained from an aromatic dicarboxylic acid and an acid anhydride α is preferred, though a monoacid anhydride may be employed therefor.

In the preparation of the component (c), it is preferred that the molar ratio of the acid anhydride α to the aromatic dicarboxylic acid be approximately 2:1 to 10:1, preferably about 2:1 to 4:1 and more preferably about 2.4:1 to 3.5:1. The acid anhydride α used in excess, if any, may be removed by heating or reducing pressure during the course of the reaction.

The preparation of the acid anhydride of an aromatic dicarboxylic acid obtained from a mixture of terephthalic acid and isophthalic acid, and acetic anhydride is now illustrated by the following reference example:

16.6 g of terephthalic acid, 16.6 g of isophthalic acid, 40.8 g of acetic anhydride were introduced into a 300 ml three-necked flask provided with a reflux condenser and a stirrer, and stirred under heating at 140° C. for 7 hours. The obtained reaction product was a mixture of 4 g of a di-acetic anhydride of terephthalic acid and 4 g of a di-acetic anhydride of isophthalic acid.

In the present invention, the reaction of the components (a), (b) and (c) may be effected either by preliminarily preparing the component (c) and then reacting the components (a) and (b) therewith; or by reacting the component (a) and the bisphenol of the general formula (I) with an excess amount of the acetic anhydride.

I. When the component (c) is preliminarily prepared and then the components (a) and (b) are reacted therewith, it is preferred that the components (a) and (b) are employed at a molar ratio of approximately 1:1 to 1.3:1, more preferably about 1:1 to 1.1:1. When the molar ratio exceeds the above range, the viscosity of the resulting polymer would hardly increase. It is preferable that the components (b) and (c) are employed at a molar ratio of approximately 1:0.005 to 1:0.3, more preferably about 1:0.005 to 1:0.1. When the amount of the component (c) is smaller than the above range, the resulting polyarylate is substantially free from any acid anhydride bond When the amount of the component (c) is larger than the above range, on the other hand, the resulting polyarylate would set to gel.

II. When the component (a) and the bisphenol of the general formula (I) is reacted with an excess amount of the acetic anhydride, the component (a) and the bisphenol are preferably employed at a molar ratio of approximately 1:1 to approximately 1.3:1. When the molar ratio exceeds the above range, the viscosity of the resulting polymer would hardly increase. It is preferred that the acetic anhydride and the component (a) are employed at a molar ratio of approximately 2:1 to approximately 10:1.

When the amount of the acetic anhydride is smaller than the above range, the resulting polyarylate is substantially free from any acid anhydride bond. When the amount thereof is larger than the above range, on the other hand, the resulting polyarylate would set to gel.

It is preferred that the process of the present invention is carried out at a temperature of approximately 120° to 350° C., more preferably about 200° to 330° C.

It is preferred that the reaction is carried out for approximately 1 to 50 hours.

Although the reaction may be carried out under atmospheric pressure, the pressure may be reduced as the reaction proceeds.

The process of the present invention may be carried out in the presence of a plasticizer. It is preferred that the plasticizer has a boiling point higher than approximately 150° C. and is substantially inert. Examples of the plasticizer include sulfolane, diphenyl ether and diphenylsulfone. It is preferable that the plasticizer is employed in an amount of approximately 5 to 200 parts by weight, more preferably about 5 to 50 parts by weight, per 100 parts by weight of the resulting polyarylate having acid anhydride bonds. The plasticizer would contribute not only to the removement of the sublimated aromatic dicarboxylic acid and bisphenol diacetate but also to the acceleration of the take-out of the resulting polyarylate having acid anhydride bonds from the polymerization vessel.

In the process of the present invention, a polyarylate of a relatively low molecular weight (a logarithmic viscosity: 0.22 or less, determined by dissolving 1 g/dl thereof in a mixed solvent of phenol and tetrachloroethane at a ratio by weight of 6/4 and measuring the logarithmic viscosity at 25° C.) may be preliminarily prepared through molten polymerization and then that of a higher molecular weight may be produced therefrom through solid phase polymerization.

The solid phase polymerization may be carried out, for example, at a reaction temperature of approximately 150° to 350° C. under atmospheric pressure to a pressure of 0.001 Torr for approximately 0.5 to 50 hours, though it is not restricted thereby. When the polymerization is to be carried out under atmospheric pressure, it may be effected under a stream of an inert gas such as nitrogen gas.

According to the present invention, a polyarylate having acid anhydride bonds capable of exhibiting a high impast strength as well as a high weld strength when formulated into a composition together with, for example, a polyamide, can be obtained. It is preferred that the polyarylate produced according to the process of the present invention has a molar ratio of acid anhydride bonds to polyester bonds, of approximately 0.003:1 to 0.10:1, more preferably about 0.006:1 to 0.04:1.

The ratio of the acid bonds to the polyester bonds in the polyarylate produced by the process of the present invention may be arbitrarily controlled by appropriately selecting the ratio of the above reactants. When the ratio of the acid anhydride bonds to the polyester bonds is lower than about 0.3% by mol, a molded product made of a composition of the polyarylate with, for example, a polyamide might have an insufficient impact strength or weld strength. When the ratio exceeds about 10% by mol, on the other hand, the heat resistance of the composition might be lowered.

The acid anhydride bonds in the polyarylate having acid anhydride bonds produced by the process of the present invention may be quantitatively analyzed by infrared spectrophotometry or NMR.

The present invention is now illustrated in greater detail with reference to specific examples, which are not to be construed as limiting the scope of the present invention.

In these Examples, the logarithmic viscosity of a polyarylate was determined by dissolving 1 g/dl of the polymer in a mixture of phenol and tetrachloroethane at a ratio by weight of 6/4 and measuring the logarithmic viscosity at 25° C. The acid anhydride bonds were determined by infrared spectrophotometry. All parts are expressed by weight.

EXAMPLE 1

4.15 parts of terephthalic acid, 4.15 parts of isophthalic acid and 10.2 parts of acetic anhydride were introduced into a reactor provided with a reflux condenser and a stirrer, heated, and stirred under reflux for 10 hours.

NMR indicated that the obtained reaction product was a mixture of 1.1 parts of diacetic anhydride of terephthalic acid, 1.0 parts of diacetic anhydride of isophthalic acid, 2.9 parts of terephthalic acid, 2.9 parts of isophthalic acid, acetic anhydride and acetic acid. This mixture contained two parts of residual acetic anhydride.

The acetic anhydride and acetic acid in the mixture were removed by heating the mixture to 100° C. while reducing the pressure to 1 Torr. Then, 85.5 parts of terephthalic acid, 85.5 parts of isophthalic acid and 312 parts of bisphenol A diacetate were added thereto. The resulting mixture was subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
| | Total | 20 |

The logarithmic viscosity of the polymer thus obtained was 0.62 while the ratio of acid anhydride bonds to polyester bonds therein was 3.5% by mol.

4.15 parts of terephthalic acid, 4.15 parts of isophthalic acid and 10.2 parts of acetic anhydride were introduced into a reactor provided with a reflux condenser and a stirrer, heated, and stirred under reflux for 10 hours. Then, the reaction mixture was heated to 100° C. while reducing the pressure to 1 Torr to thereby remove the acetic anhydride and acetic acid. 200 parts of toluene was added to the residue and the resulting mixture was stirred. Thus a toluene solution with solid matter dispersed therein was obtained. After filtering out the solid matter, the toluene was removed from the toluene solution by heating under reduced pressure to thereby give a solid.

NMR analysis indicated that the obtained solid was a mixture of 1.1 parts of diacetic anhydride of terephthalic acid and 1.1 parts of diacetic anhydride of isophthalic acid.

Five parts of this solid was added to 83 parts of terephthalic acid, 83 parts of isophthalic acid and 312 parts of bisphenol A diacetate and the resulting mixture was subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
| | Total | 20 |

The logarithmic viscosity of the polymer thus obtained was 0.63 while the ratio of acid anhydride bonds to polyester bonds therein was 1.8% by mol.

EXAMPLE 3

87.15 parts of terephthalic acid, 87.15 parts of isophthalic acid and 214.2 parts of acetic anhydride were introduced into a reactor provided with a reflux condenser and a stirrer, heated, and stirred under reflux for 10 hours.

NMR analysis indicated that the obtained reaction product was a mixture of 22.9 parts of diacetic anhydride of terephthalic acid, 23 parts of diacetic anhydride of isophthalic acid, 61 parts of terephthalic acid, 60 parts of isophthalic acid, acetic anhydride and acetic acid.

The acetic anhydride and acetic acid in the mixture were removed by heating the mixture to 100° C. while reducing the pressure to 1 Torr. Then, 830 parts of terephthalic acid, 830 parts of isophthalic acid and 3,120 parts of bisphenol A diacetate were added thereto. The resulting mixture was subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
| | Total | 20 |

The logarithmic viscosity of the polymer thus obtained was 0.60 while the ratio of acid anhydride bonds to polyester bonds therein was 3.3% by mol.

EXAMPLE 4

4.15 parts of terephthalic acid, 4.15 parts of isophthalic acid and 13.3 parts of acetic anhydride were introduced into a reactor provided with a reflux condenser and a stirrer, heated, and stirred under reflux for 10 hours.

NMR analysis indicated that the obtained reaction product was a mixture of 1.1 parts of diacetic anhydride of terephthalic acid, 1.1 parts of diacetic anhydride of isophthalic acid, 2.9 parts of terephthalic acid, 2.9 parts of isophthalic acid, acetic anhydride and acetic acid.

This mixture contained three parts of residual acetic anhydride.

The acetic anhydride and acetic acid in the mixture were removed by heating the mixture to 100° C. while reducing the pressure to 1 Torr. Then, 86.7 parts of terephthalic acid, 86.7 parts of isophthalic acid and 312 parts of bisphenol A diacetate were added thereto. The resulting mixture was subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
|  | Total | 20 |

The logarithmic viscosity of the polymer thus obtained was 0.62 while the ratio of acid anhydride bonds to polyester bonds therein was 4.9% by mol.

EXAMPLE 5

4.15 parts of terephthalic acid, 4.15 parts of isophthalic acid and 10.2 parts of acetic anhydride were introduced into a reactor provided with a reflux condenser and a stirrer, heated, and stirred under reflux for 10 hours.

NMR analysis indicated that the obtained reaction product was a mixture of 1.1 parts of diacetic anhydride of terephthalic acid, 1.1 parts of diacetic anhydride of isophthalic acid, 2.9 parts of terephthalic acid, 2.9 parts of isophthalic acid, acetic anhydride and acetic acid. This mixture contained two parts of residual acetic anhydride.

The acetic anhydride and acetic acid in the mixture were removed by heating the mixture to 100° C. while reducing the pressure to 1 Torr. Then, 85.5 parts of terephthalic acid, 85.5 parts of isophthalic acid, and 312 parts of bisphenol A diacetate and 145 parts of diphenyl ether were added thereto. The resulting mixture was subjected to molten polymerization under the following conditions with stirring.

| Temperature (°C.) | Pressure | Period (hr) |
|---|---|---|
| 270 | atmospheric | 10 |
| " | 50 Torr | 5 |
| 280 | 1 Torr | " |
| 300 | 0.2 Torr | " |
|  | Total | 25 |

The diphenyl ether was distilled off from the system under reduced pressure. The logarithmic viscosity of the polymer thus obtained was 0.65 while the ratio of acid anhydride bonds to polyester bonds therein was 3.5% by mol.

EXAMPLE 6

228 parts of bisphenol A and 214 parts of acetic anhydride were introduced into a reactor provided with a reflux condenser and a stirrer, heated, and stirred under reflux for 10 hours. After distilling off the acetic acid under reduced pressure, 312 parts of bisphenol A diacetate was obtained. This bisphenol A diacetate, five parts of the mixture of diacetic anhydride of terephthalic acid and diacetic anhydride of isophthalic acid as used in Example 2, 83 parts of terephthalic acid and 83 parts of isophthalic acid were subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
|  | Total | 20 |

The logarithmic viscosity of the polymer thus obtained was 0.62 while the ratio of acid anhydride bonds to polyester bonds therein was 3.5% by mol.

EXAMPLE 7

6.64 parts of terephthalic acid, 1.66 parts of isophthalic acid and 13.3 parts of acetic anhydride were introduced into a reactor provided with a reflux condenser and a stirrer, heated, and stirred under reflux for 10 hours.

NMR analysis indicated that the obtained reaction product was a mixture of 1.6 parts of diacetic anhydride of terephthalic acid, 1.6 parts of diacetic anhydride of isophthalic acid, 2.5 parts of terephthalic acid, 2.5 parts of isophthalic acid, acetic anhydride and acetic acid. This mixture contained three parts of residual acetic anhydride.

The acetic anhydride and acetic acid in the mixture were removed by heating the mixture to 100° C. while reducing the pressure to 1 Torr. Then, 138.7 parts of terephthalic acid, 34.7 parts of isophthalic acid, and 312 parts of bisphenol A diacetate and 145 parts of diphenyl ether were added thereto. The resulting mixture was subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
|  | Total | 20 |

The diphenyl ether was distilled off from the system under reduced pressure. The logarithmic viscosity of the polymer thus obtained was 0.63 while the ratio of acid anhydride bonds to polyester bonds therein was 4.8% by mol.

EXAMPLE 8

8.3 parts of isophthalic acid and 13.3 parts of acetic anhydride were introduced into a reactor provided with a reflux condenser and a stirrer, heated, and stirred under reflux for 10 hours.

NMR analysis indicated that the obtained reaction product was a mixture of 3.3 parts of diacetic anhydride of isophthalic acid, 5 parts of isophthalic acid, acetic anhydride and acetic acid. This mixture contained three parts of residual acetic anhydride.

The acetic anhydride and acetic acid in the mixture were removed by heating the mixture to 100° C. while reducing the pressure to 1 Torr. Then, 173.4 parts of isophthalic acid, 312 parts of bisphenol A diacetate and 145 parts of diphenyl ether were added thereto. The resulting mixture was subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
|  | Total | 20 |

The diphenyl ether was distilled off from the system under reduced pressure The logarithmic viscosity of the polymer thus obtained was 0.60 while the ratio of acid anhydride bonds to polyester bonds therein was 4.7% by mol.

EXAMPLE 9

3.32 parts of terephthalic acid, 13.3 parts of isophthalic acid and 30.6 parts of acetic anhydride were introduced into a reactor provided with a reflux condenser and a stirrer, heated, and stirred under reflux for 7 hours.

NMR analysis indicated that the obtained reaction product was a mixture of 0.65 part of diacetic anhydride of terephthalic acid, 2.6 parts of diacetic anhydride of isophthalic acid, 2.5 parts of terephthalic acid, 10 parts of isophthalic acid, acetic anhydride and acetic acid.

The acetic anhydride and acetic acid in the mixture were removed by heating the mixture to 100° C. while reducing the pressure to 1 Torr. Then, 34.9 parts of terephthalic acid, 139.4 parts of isophthalic acid, and 312 parts of bisphenol A diacetate were added thereto. The resulting mixture was stirred under atmospheric pressure at 300° C. for two hours. Then, the pressure was reduced to 1 Torr over one hour while continuing the stirring. The mixture was heated to 320° C. over 30 minutes while maintaining the pressure at 1 Torr and then the stirring was effected for additional five hours under these conditions. Thus a polymer of a logarithmic viscosity of 0.65 was obtained. The ratio of acid anhydride bonds to polyester bonds in this polymer was 3.0% by mol.

EXAMPLE 10

3.32 parts of terephthalic acid, 13.3 parts of isophthalic acid and 40.8 parts of acetic anhydride were introduced into a reactor provided with a reflux condenser and a stirrer, heated, and stirred under reflux for 7 hours.

The reaction product obtained was a mixture of 0.87 parts of diacetic anhydride of terephthalic acid, 3.5 parts of diacetic anhydride of isophthalic acid, 2.1 parts of terephthalic acid, 8.6 parts of isophthalic acid, acetic anhydride and acetic acid.

The acetic anhydride and acetic acid in the reaction mixture were removed by heating the mixture to 100° C. while reducing the pressure to 1 Torr. Then, 43.2 parts of terephthalic acid, 172.6 parts of isophthalic acid and 312 parts of bisphenol A diacetate were added thereto. The resulting mixture was stirred under atmospheric pressure at 300° C. for two hours. Then, the pressure was reduced to 1 Torr over one hour. Subsequently, the mixture was heated to 320° C. over 30 minutes while maintaining the pressure at 1 Torr and the stirring was effected for additional five hours under these conditions. Thus a polymer of a logarithmic viscosity of 0.67 was obtained. The ratio of acid anhydride bonds to polyester bonds in this polymer was 3.5% by mol.

EXAMPLE 11

8.3 parts of terephthalic acid, 8.3 parts of isophthalic acid and 51 parts of acetic anhydride were introduced into a reactor provided with a reflux condenser and a stirrer, heated, and stirred under reflux for seven hours.

The reaction product obtained was a mixture of 5.5 parts of diacetic anhydride of terephthalic acid, 5.5 parts of diacetic anhydride of isophthalic acid, 2.5 parts of terephthalic acid, 2.5 parts of isophthalic acid, acetic anhydride and acetic acid.

The acetic anhydride and acetic acid in the reaction mixture were removed by heating the mixture to 100° C. while reducing the pressure to 1 Torr. Then, 83 parts of terephthalic acid, 83 parts of isophthalic acid and 312 parts of bisphenol A diacetate were added thereto. The resulting mixture was stirred under atmospheric pressure at 300° C. for two hours. Then, the pressure was reduced to 1 Torr over one hour while continuing stirring. Subsequently, the mixture was heated to 320° C. over 30 minutes while maintaining the pressure at 1 Torr and the stirring was effected for additional five hours under these conditions. Thus a polymer of a logarithmic viscosity of 0.72 was obtained. The ratio of acid anhydride bonds to polyester bonds in this polymer was 4.5% by mol.

EXAMPLE 12

88 parts of terephthalic acid 88 parts of isophthalic acid, 245 parts of acetic anhydride and 228 parts of bisphenol A were stirred under reflux for seven hours. Thus a mixture of 1.1 parts of diacetic anhydride of terephthalic acid, 1.1 parts of diacetic anhydride of isophthalic acid, 312 parts of bisphenol A diacetate, 87 parts of terephthalic acid, 86 parts of isophthalic acid, acetic anhydride and acetic acid was obtained. This mixture was heated to 300° C. over two hours under stirring. During this period, the acetic acid and acetic anhydride contained therein were distilled off.

After reducing the pressure to 1 Torr over 30 minutes, the stirring was effected for additional five hours. Thus a polymer of a logarithmic viscosity of 0.62 was obtained. The ratio of acid anhydride bonds to polyester bonds in this polymer was 3.5% by mol.

EXAMPLE 13

The procedure of Example 12 was repeated except that 357 parts of acetic anhydride was employed as the starting material. Thus a mixture of 2.2 parts of diacetic anhydride of terephthalic acid, 2.2 parts of diacetic anhydride of isophthalic acid, 312 parts of bisphenol A diacetate, 85.5 parts of terephthalic acid and 85.5 parts of isophthalic acid was obtained The resulting mixture was polymerized under the same conditions as those employed in Example 12. Thus a polymer of a logarithmic viscosity of 0.65 was obtained. The ratio of acid anhydride bonds to polyester bonds in this polymer was 5.0% by mol.

COMPARATIVE EXAMPLE 1

83 parts of terephthalic acid, 83 parts of isophthalic acid and 312 parts of bisphenol A diacetate were subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
| | Total | 20 |

The obtained polymer had a logarithmic viscosity of 0.62 and was substantially free from any acid anhydride bonds.

COMPARATIVE EXAMPLE 2

132.8 parts of terephthalic acid, 33.2 parts of isophthalic acid, 312 parts of bisphenol A diacetate and 145 parts of diphenyl ether were subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
| | Total | 20 |

The diphenyl ether was distilled off under reduced pressure. The obtained polymer had a logarithmic viscosity of 0.63 and was substantially free from any acid anhydride bonds.

COMPARATIVE EXAMPLE 3

173.4 parts of isophthalic acid, 312 parts of bisphenol A diacetate and 145 parts of diphenyl ether were subjected to molten polymerization under the following conditions with stirring.

| Temperature (°C.) | Pressure | Period (hr) |
|---|---|---|
| 270 | atmospheric | 5 |
| " | 50 Torr | " |
| 280 | 1 Torr | " |
| 300 | 0.2 Torr | " |
| | Total | 20 |

The diphenyl ether was distilled off under reduced pressure. The obtained polymer had a logarithmic viscosity of 0.60 and was substantially free from any acid anhydride bonds.

COMPARATIVE EXAMPLE 4

0.5 part of isophthalic acid and 1 part of acetic anhydride were stirred under reflux for 7 hours. To the resulting reaction product (which contained 0.15 parts of diacetic anhydride of isophthalic acid), 83 parts of isophthalic acid, 83 parts of terephthalic acid and 312 parts of bisphenol A diacetate were added. The obtained mixture was stirred at 300° C. for two hours and then the pressure was reduced to 1 Torr over 30 minutes. The stirring was continued for additional five hours. The obtained polymer had a logarithmic viscosity of 0.61 and was free from any acid anhydride bonds.

COMPARATIVE EXAMPLE 5

41.5 parts of terephthalic acid, 41.5 parts of isophthalic acid and 1,000 parts of acetic anhydride were refluxed for seven hours under stirring. The obtained product was a mixture of 43.6 parts of diacetic anhydride of terephthalic acid, 43.6 parts of diacetic anhydride of isophthalic acid, 4 parts of terephthalic acid and 4 parts of isophthalic acid. The acetic acid and acetic anhydride were removed from this product under reduced pressure. Then, 83 parts of terephthalic acid, 83 parts of isophthalic acid and 312 parts of bisphenol A diacetate were added thereto. The resulting mixture was stirred at 300° C. for two hours and then the pressure was reduced to 1 Torr over one hour. The stirring was continued for additional five hours under these conditions. Thus a gelatinous product insoluble in a mixed solvent (6:4 by weight) of phenol and tetrachloroethane was obtained.

COMPARATIVE EXAMPLE 6

83 parts of terephthalic acid, 83 parts of isophthalic acid, 214 parts of acetic anhydride and 228 parts of bisphenol A were introduced into a reactor provided with a reflux condenser and a stirrer, and stirred therein under reflux for seven hours. The reaction product thus obtained was a mixture containing neither diacetic anhydride of terephthalic acid nor diacetic anhydride of isophthalic acid. It contained 312 parts of bisphenol A diacetate, terephthalic acid, isophthalic acid, acetic anhydride and acetic acid.

This reaction mixture was stirred at 300° C. for two hours and then the pressure was reduced to 1 Torr over one hour. The stirring was continued for an additional five hours under these conditions. Thus a polymer having a logarithmic viscosity of 0.60 was obtained. This polymer was free from any acid anhydride bonds.

COMPARATIVE EXAMPLE 7

141 parts of terephthalic acid, 141 parts of isophthalic acid, 1,326 parts of acetic anhydride and 228 parts of bisphenol A were introduced into a reactor provided with a reflux condenser and a stirrer, and stirred therein under reflux for seven hours. The reaction product thus obtained was a mixture containing 312 parts of bisphenol A diacetate, 91 parts of terephthalic acid, 91 parts of isophthalic acid, acetic anhydride and acetic acid as well as 54 parts of diacetic anhydride of terephthalic acid and 55 parts of diacetic anhydride of isophthalic acid.

The reaction mixture was stirred at 300° C. for two hours and then the pressure was reduced to 1 Torr over one hour. The stirring was continued for additional five hours under these conditions. Thus a gelatinous product insoluble in a mixed solvent (6:4 by weight) of phenol and tetrachloroethane was obtained.

REFERENCE EXAMPLE 50 parts by weight of each polymer as obtained in Examples 1 to 13 and Comparative Examples 1 to 4 and 6 was mixed with 50 parts of Nylon 6 (mfd. by Unitika Ltd., A-1030 BRL, relative viscosity: 2.6) and dried under a pressure of 10 Torr at 100° C. for 10 hours. Then, the dried material was melt-extruded by using a biaxial extruder at 300° C. to thereby give pellets. These pellets were dried under 10 Torr at 100° C. molded with an injection molding machine at 280° C. Thus test samples for the evaluation of impact strength and weld strength were obtained. The impact strength was measured in accordance with a method as defined by ASTM-D256 using a test piece in the form as defined by ASTM-D256. The test sample used in the measurement of the weld strength was a molded product in which a resin was introduced from both sides thereof such that a weld line is formed in the neighborhood of a center of molded product having the same shape as No. 1 dumbbell as defined by ASTM-D638. The weld strength was determined by measuring a tensile strength of the test sample in accordance with a method as defined by ASTM-D638. The following Table 1 shows the results of the evaluation.

TABLE 1

| Example No. | 1" Notched Izod Impact Strength (kg · cm/cm) | Weld Strength (kg/cm²) |
|---|---|---|
| Example 1 | 7 | 710 |
| Example 2 | 8 | 750 |
| Example 3 | 7 | 730 |
| Example 4 | 5 | 650 |
| Example 5 | 7 | 700 |
| Example 6 | 7 | 700 |
| Example 7 | 6 | 650 |
| Example 8 | 6 | 650 |
| Example 9 | 7 | 710 |
| Example 10 | 7 | 700 |
| Example 11 | 5 | 650 |
| Example 12 | 7 | 710 |
| Example 13 | 5 | 650 |
| Comparative Example 1 | 1 | 250 |
| Comparative Example 2 | 1 | 200 |
| Comparative Example 3 | 1 | 200 |
| Comparative Example 4 | 1 | 200 |
| Comparative Example 6 | 1 | 230 |

Table 1 demonstrates that each polyarylate produced by the process of the present invention exhibited a high impact strength and a high weld strength when formulated into a resin composition together with a polyamide.

While the invention has been described in detail and with reference to specific embodiments thereof, it will be apparent to one skilled in the art that various changes and modifications can be made therein without departing from the spirit and scope thereof.

What is claimed is:

1. A process for producing a polyarylate comprising the step f reacting (a) an aromatic dicarboxylic acid, (b) a bisphenol diacetate and (c) an aliphatic carboxylic acid anhydride of an aromatic dicarboxylic acid, to produce a polyarylate containing acid anhydride bonds, wherein said aliphatic carboxylic acid anhydride of said aromatic dicarboxylic acid (c) is first produced by reacting an aromatic dicarboxylic acid and an acid anhydride of an aliphatic carboxylic acid, after which said aliphatic carboxylic acid anhydride of an aromatic dicarboxylic acid (c) is reacted with said aromatic dicarboxylic acid (a) and said bisphenol diacetate (b).

2. The process as claimed in claim 1, wherein the molar ratio of said aromatic dicarboxylic acid (a) to said bisphenol diacetate (b) is from about 1:1 to 1.3:1, and the molar ratio of said bisphenol diacetate (b) to said aliphatic carboxylic acid anhydride of an aromatic dicarboxylic acid (c) is from about 10:0.005 to 1:0.3.

3. The process as claimed in claim 2, wherein the molar ratio of said aromatic dicarboxylic acid (a) to said bisphenol diacetate (b) is from about 1:1 to 1.1:1, and the molar ratio of said bisphenol diacetate (b) to said aliphatic carboxylic acid anhydride of an aromatic dicarboxylic acid (c) is from about 1:0.005 to 1:0.1.

4. The process as claimed in claim 1, wherein said aromatic dicarboxylic acid (a) is selected from terephthalic acid, isophthalic acid, naphthalene dicarboxylic acid and a mixture thereof.

5. The process as claimed in claim 1, wherein said bisphenol diacetate (b) is the reaction product of acetic anhydride or ketene and a bisphenol represented by formula (I):

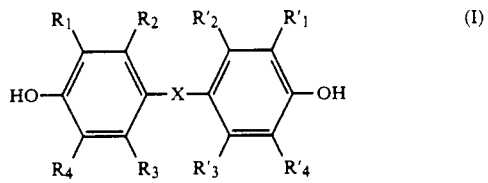

wherein X represents oxygen, sulfur, —SO—, —SO$_2$—, CO—, an alkylene group having 1 to 4 carbons, or an alkylidene group having 2 to 4 carbons; and $R_1$, $R_2$, $R_3$, $R_4$, $R'_1$, $R'_2$, $R'_3$ and $R'_4$, which may be the same or different, each represents hydrogen, a halogen or an alkyl group having 1 to 4 carbons.

6. The process as claimed in claim 5, wherein said bisphenol diacetate (b) is bisphenol A diacetate.

7. The process as claimed in claim 1, wherein said aliphatic carboxylic acid anhydride of an aromatic dicarboxylic acid (c) is selected from diacetic anhydride of terephthalic acid, diacetic anhydride of isophthalic acid, and diacetic anhydride of naphthalene dicarboxylic acid.

8. The process as claimed in claim 1, wherein said aliphatic carboxylic acid anhydride of an aromatic dicarboxylic acid (c) is a diacid anhydride.

9. The process as claimed in claim 2, wherein the molar ratio of said acid anhydride of an aliphatic carboxylic acid to said aromatic dicarboxylic acid in said first step is from about 2:1 to 10:1.

10. The process as claimed in claim 9, wherein the molar ratio of said acid anhydride of an aliphatic carboxylic acid to said aromatic dicarboxylic acid in said first step is from about 2:1 to 4:1.

11. The process as claimed in claim 10, wherein the molar ratio of said acid anhydride of an aliphatic carboxylic acid to said aromatic dicarboxylic acid in said first step is from about 2.4:1 to 3.5:1.

12. The process as claimed in claim 1, wherein said reacting is performed at a temperature of about 120° to 350° C. for a period of from about 1 to 50 hours.

13. The process as claimed in claim 12, wherein said reacting is carried out at a temperature of about 200° to 330° C.

14. The process as claimed in claim 1, wherein said reacting is carried out in the presence of a plasticizer selected from sulfolane, diphenyl ether and diphenylsulfone, said plasticizer being present in an amount of from about 5 to 200 parts by weight per 100 parts by weight of said polyarylate containing acid anhydride bonds.

15. The process as claimed in claim 1, wherein said polyarylate has a molar ratio of acid anhydride bonds to polyester bonds of about 0.003:1 to 0.10:1.

16. The process as claimed in claim 15, wherein said polyarylate has a molar ratio of acid anhydride bonds to polyester bonds of about 0.006:1 to 0.04:1.

* * * * *